(12) United States Patent
Baykaner et al.

(10) Patent No.: US 11,265,147 B2
(45) Date of Patent: Mar. 1, 2022

(54) SECURE DOCUMENT MANAGEMENT

(71) Applicant: Nokia Technologies Oy, Espoo (FI)

(72) Inventors: Khan Baykaner, Upper Cambourne (GB); Troels Roennow, Cambridge (GB); Antti Niskanen, Espoo (FI); Philip Gordon Derrick, Highfields Caldecote (GB); Leo Mikko Johannes Kärkkäinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 307 days.

(21) Appl. No.: 16/466,112

(22) PCT Filed: Dec. 16, 2016

(86) PCT No.: PCT/FI2016/050890
§ 371 (c)(1),
(2) Date: Jun. 3, 2019

(87) PCT Pub. No.: WO2018/109260
PCT Pub. Date: Jun. 21, 2018

(65) Prior Publication Data
US 2019/0305937 A1 Oct. 3, 2019

(51) Int. Cl.
*H04L 29/06* (2006.01)
*H04L 9/06* (2006.01)
*G06F 16/22* (2019.01)
*G06F 21/60* (2013.01)
*H04L 9/32* (2006.01)
(Continued)

(52) U.S. Cl.
CPC ........ *H04L 9/0637* (2013.01); *G06F 16/2246* (2019.01); *G06F 21/16* (2013.01);
(Continued)

(58) Field of Classification Search
CPC ... H04L 9/0637; H04L 9/3236; H04L 9/0643; H04L 9/3297; H04L 2209/56;
(Continued)

(56) References Cited

U.S. PATENT DOCUMENTS 7,606,795 B2 * 10/2009 Hsu ..................... G06F 16/2455
8,019,882 B2 9/2011 Rao et al.
(Continued)

FOREIGN PATENT DOCUMENTS

| CN | 105719185 A | 6/2016 |
|----|-------------|--------|
| CN | 105790954 A | 7/2016 |
| WO | 2016/131576 A1 | 8/2016 |

OTHER PUBLICATIONS

"Merkling in Ethereum", Ethereum Blog, Retrieved on May 21, 2019, Webpage available at: https://blog.ethereum.org/2015/11/15/merkling-in-ethereum/.
(Continued)

*Primary Examiner* — Mahfuzur Rahman
(74) *Attorney, Agent, or Firm* — Laine IP Oy (57) ABSTRACT

According to an example aspect of the present invention, there is provided an apparatus comprising at least one processing core, at least one memory including computer program code, the at least one memory and the computer program code being configured to, with the at least one processing core, cause the apparatus at least to obtain a document, segmented into a first number of segments (510), obtain the first number of outputs of a cryptographic operation, such that for each output, a random value and a document segment are employed to generate an input to the cryptographic operation (520), build a Merkle tree based on the outputs of the cryptographic operation (530), and store a top hash of the Merkle tree in a block chain (540).

17 Claims, 5 Drawing Sheets

(51) Int. Cl.
  *G06F 21/64* (2013.01)
  *G06F 21/16* (2013.01)
  *G06Q 20/12* (2012.01)
  *G06Q 50/18* (2012.01)

(52) U.S. Cl.
  CPC .......... *G06F 21/602* (2013.01); *G06F 21/645* (2013.01); *H04L 9/0643* (2013.01); *H04L 9/3236* (2013.01); *H04L 9/3297* (2013.01); *G06Q 20/12* (2013.01); *G06Q 50/18* (2013.01); *G06Q 2220/00* (2013.01); *H04L 2209/38* (2013.01); *H04L 2209/56* (2013.01)

(58) Field of Classification Search
  CPC ... H04L 2209/38; G06F 21/645; G06F 21/16; G06F 16/2246; G06F 21/602; G06Q 20/12; G06Q 2220/00; G06Q 50/18
  See application file for complete search history.

(56) References Cited

U.S. PATENT DOCUMENTS

| | | |
|---|---|---|
| 8,689,352 B2 | 4/2014 | Schaad et al. |
| 2013/0276058 A1 | 10/2013 | Buldas et al. |
| 2016/0098723 A1 | 4/2016 | Feeney |
| 2016/0164884 A1 | 6/2016 | Sriram et al. |
| 2016/0218879 A1 | 7/2016 | Ferrin |
| 2016/0283920 A1 | 9/2016 | Fisher et al. |
| 2016/0323109 A1 | 11/2016 | McCoy et al. |
| 2017/0206523 A1* | 7/2017 | Goeringer ............ G06Q 20/409 |
| 2017/0243193 A1* | 8/2017 | Manian ................ G06Q 20/065 |
| 2019/0073666 A1* | 3/2019 | Ortiz ...................... G06F 16/27 |

OTHER PUBLICATIONS

International Search Report and Written Opinion received for corresponding Patent Cooperation Treaty Application No. PCT/FI2016/050890, dated Mar. 16, 2017, 17 pages.

Jämthagen et al., "Blockchain-Based Publishing Layer for the Keyless Signing Infrastructure", Intl IEEE Conferences on Ubiquitous Intelligence & Computing, Advanced and Trusted Computing, Scalable Computing and Communications, Cloud and Big Data Computing, Internet of People, and Smart World Congress (UIC/ATC/ScalCom/CBDCom/IoP/SmartWorld), Jul. 18-21, 2016, pp. 374-381.

* cited by examiner

SECURE DOCUMENT MANAGEMENT

RELATED APPLICATION

This application was originally filed as PCT Application No. PCT/FI2016/050890 filed Dec. 16, 2016.

FIELD

The present invention relates, for example, to version management, retrieval, archiving and dissemination of documents and/or parts thereof.

BACKGROUND

Document management systems may be designed to meet specific goals and targets in line with the type of documents being managed. For example, long-term storage of documents may be accomplished by archiving them on microfilm or acid-free paper. When confidential documents need to be created in a multilateral and secure way, digital technologies may be of use. For example, time-stamping, watermarking, encryption and version management databases may be used to keep track of when a document was created in various versions, and enabling selective access to the documents.

Transactions, such as document-related transactions, in digital systems may take several different forms. For example, credit card transactions may be verified by querying, from an issuer of the card, whether a credit account associated with the credit card has sufficient remaining credit to cover the transaction. Additionally, a client identity may be verified, which may take place by requesting the client to enter a pin code or to provide a signature. In some cases, the client may be requested to present a proof-of-identity document, such as a passport. Yet further, a bank issuing the credit card may call the client's mobile phone before approving the transaction, in case the transaction meets certain criteria.

Block chains present a solution, wherein a resource, such as information, is recorded in a ledger, which may be public. Changes in resource ownership take the form of transactions, wherein a transaction may comprise an identifier of a new owner, that is the recipient, of the resource, optionally together with a cryptographic signature of the previous owner, that is the sender, such that malicious attackers cannot re-assign resources they do not own. A cryptographic signature may be generated using a private key of a private key-public key pair. Validity of the cryptographic signature may be verified using the public key, while the signature can only be generated using the private key. While the public key may be freely shared with no reduction in security, the private key is closely kept by the owner.

In a block chain, transactions are recorded in blocks comprised in the chain, wherein the chain may comprise a massively replicated database. In principle, a chain of previous owners, or at least their identifiers, of each resource can be assessed based on the block chain. In some cases, massively replicated may mean that each node in the network has a copy of the transactions

SUMMARY OF THE INVENTION

According to a first aspect of the present invention, there is provided an apparatus comprising at least one processing core, at least one memory including computer program code, the at least one memory and the computer program code being configured to, with the at least one processing core, cause the apparatus at least to obtain a document, segmented into a first number of segments, obtain the first number of outputs of a cryptographic operation, such that for each output, a random value and a document segment are employed to generate an input to the cryptographic operation, build a Merkle tree based on the outputs of the cryptographic operation, and store a top hash of the Merkle tree in a block chain.

Various embodiments of the first aspect may comprise at least one feature from the following bulleted list:
- the cryptographic operation comprises a hash operation
- cryptographic operation comprises an encryption operation
- each output, the apparatus is configured to generate the input to the cryptographic operation by concatenating a first byte array corresponding to the random value and a second byte array corresponding to the document segment
- for each output, the apparatus is configured to generate the input to the cryptographic operation by performing an exclusive-or operation with the random value and the document segment
- the apparatus is further configured to cause a timestamp to be included in the block chain, the timestamp indicating a time when the top hash is stored in the block chain
- the apparatus is further configured to store a link to the block chain in an access control document
- each document segment comprises one of the following: exactly one word, exactly two words, exactly three words, exactly four words, exactly five words, an image and a segment of recorded sound
- the apparatus is further configured to add a new block to the block chain.

According to a second aspect of the present invention, there is provided a method comprising obtaining a document, segmented into a first number of segments, obtaining the first number of outputs of a cryptographic operation, such that for each output, a random value and a document segment are employed to generate an input to the cryptographic operation, building a Merkle tree based on the outputs of the cryptographic operation, and storing a top hash of the Merkle tree in a block chain.

Various embodiments of the second aspect may comprise at least one feature corresponding to a feature from the preceding bulleted list laid out in connection with the first aspect.

According to a third aspect of the present invention, there is provided an apparatus comprising means for obtaining a document, segmented into a first number of segments, means for obtaining the first number of outputs of a cryptographic operation, such that for each output, a random value and a document segment are employed to generate an input to the cryptographic operation, means for building a Merkle tree based on the outputs of the cryptographic operation, and means for storing a top hash of the Merkle tree in a block chain.

According to a fourth aspect of the present invention, there is provided a non-transitory computer readable medium having stored thereon a set of computer readable instructions that, when executed by at least one processor, cause an apparatus to at least obtaining a document, segmented into a first number of segments, obtaining the first number of outputs of a cryptographic operation, such that for each output, a random value and a document segment are employed to generate an input to the cryptographic operation, building a Merkle tree based on the outputs of the cryptographic operation, and storing a top hash of the Merkle tree in a block chain.

According to a fifth aspect of the present invention, there is provided a computer program configured to cause a method in accordance with the second aspect to be performed.

EMBODIMENTS

To enable tracking of a moment when a document is created, the document may be hashed word by word in a Merkle tree, and the resulting top hash may be stored in a block chain. This may enable proving that the document, or part of it, was in existence at a specific moment, which may correspond to a moment when the block containing the corresponding top hash was established in the block chain. Disclosure of only part of the document may further be enabled by hashing the document parts with random values. Further, non-disclosure agreements may be linked with the Merkle tree and/or the block chain.

Figure 1:
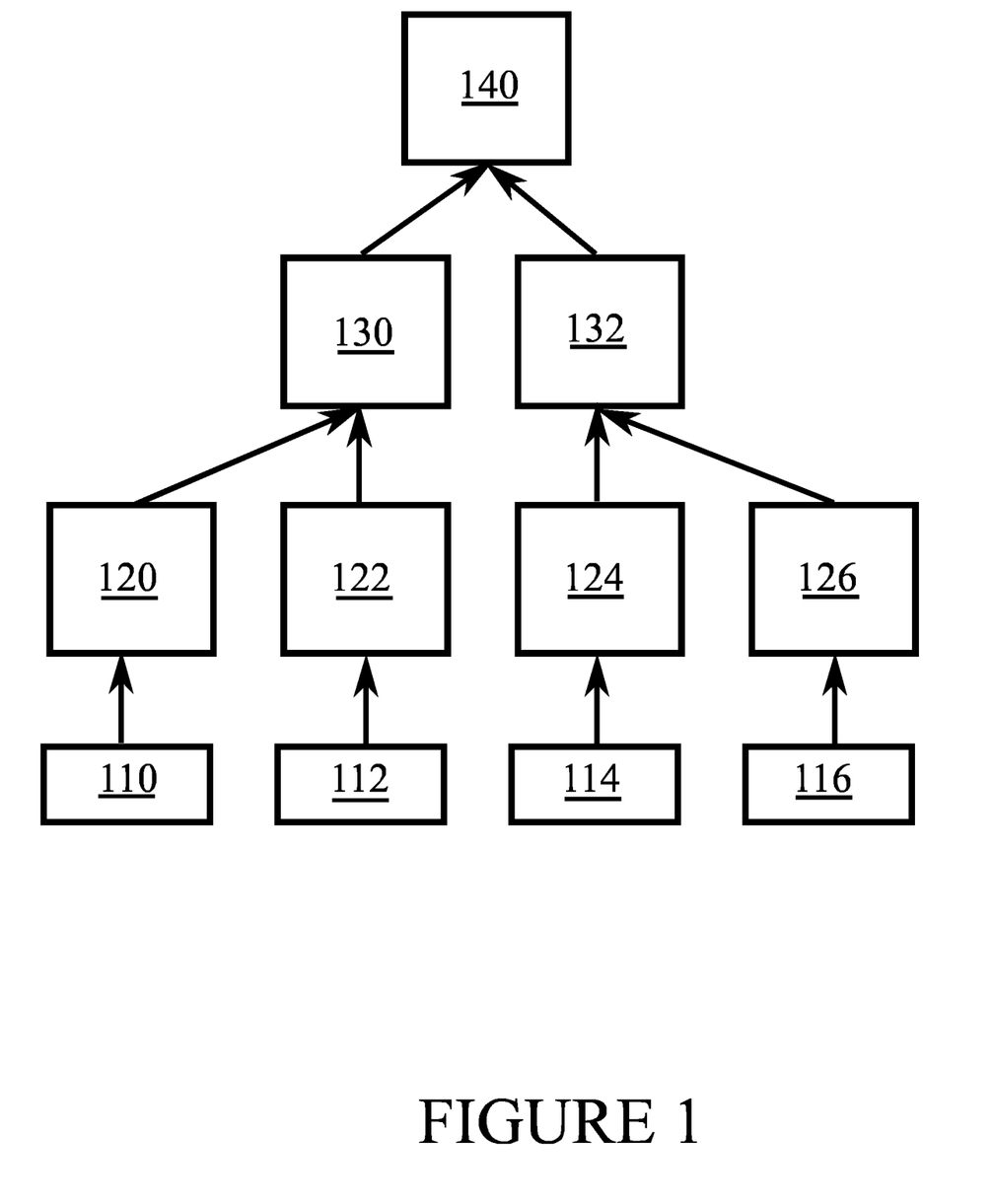
FIG. 1 illustrates an example system in accordance with at least some embodiments of the present invention.

FIG. 1 illustrates an example system in accordance with at least some embodiments of the present invention. To enable the advantages described above, a document may be segmented into segments. Where the document is a text document, each segment may comprise a word, a few words, a paragraph or sentence, for example. Where the document is an audio clip, each segment may comprise a subsection of the audio clip, such as, for example, 100 milliseconds, 50 milliseconds, or where the audio is encoded, one or several code words of the encoded audio. Video files may be handled correspondingly by segmenting the video file and/or still images comprised therein into parts. Video coding techniques may enable segmenting based on code words, as in the audio clip case. When working with digital documents, the segments may be of equal length.

The segments may be hashed into a Merkle tree, the top hash of which may be stored in a block chain based information structure. In general a Merkle tree, also known as a hash tree, is a tree data structure in which each node comprises a hash of the hashes of its child nodes. Exceptions to this are the so-called leaf nodes, which have no child nodes.

FIG. 1 illustrates an example of a Merkle tree. The leaf nodes 110, 112, 114 and 116 each store one input value to a hash function. Each input value may be obtained from exactly one document segment and a random value. Where the document segment is a bit array, for example, the random value may be a bit array of the same length, for example. Alternatively, the random value may be a bit array of half the length of the segment. Random values may in practice be pseudo-random values, generated in a computing device in accordance with random number generation processes that are known in the art. The number of leaf nodes may be the same as the number of segments in the document. Zero-padding of the document may be used to complete a suitable number of leaf nodes. The random values may be generated in response to the document, by generating a number of random values that is equal to the number of segments. The number of leaf nodes will usually exceed the four leaf nodes illustrated in FIG. 1, since documents may contain thousands of words.

The inputs stored in leaf nodes 110, 112, 114 and 116 may be obtained by concatenating the document segment byte array with the random value byte array. Alternatively, an exclusive-or, XOR, operation may be used between the document segment value and the random value to arrive at an input value.

Node 120 stores a hash of the input value in leaf node 110. Node 122 stores a hash of the input value in leaf node 112. Node 124 stores a hash of the input value in leaf node 114. Node 126 stores a hash of the input value in leaf node 116. A suitable hash function may be used, which may comprise, for example, a cryptographic hash function such as SHA-2 or SHA-3. Alternatively, non-cryptographic hash functions, such as Jenkins hash functions, may be employed.

The random values used in obtaining the input values stored in the leaf nodes may be securely stored, for example locally or in a cloud storage account. A cloud storage account may be encrypted to secure the random values.

Node 130 stores a hash of an input obtained from node 120 and node 122. For example, the hashes stored in node 120 and node 122 may be concatenated and provided as input to a hash function, to obtain the hash stored in node 130. Alternatively, XOR may be used to the hashes from node 120 and node 122 to provide the input to the hash function.

Similarly to what was done for node 130, node 132 stores a hash of an input obtained from hashes stored in node 124 and node 126. As in the case of node 130, the input may be formed by concatenation or XOR operations, for example. The hash functions used in different layers of the Merkle tree need not be the same hash functions.

Node 140 stores the top hash, obtained by hashing an input obtained from hashes stored in the second-highest layer nodes. In the simple Merkle tree of FIG. 1, these are node 130 and node 132. For example, the hashes stores in node 130 and node 132 may be concatenated and provided as input to a hash function, to obtain the hash stored in node 140. Alternatively, XOR may be used to the hashes from node 130 and node 132 to provide the input to the hash function.

The number of layers in the Merkle tree depends on the number of document segments, and thus the number of leaf nodes. In the usual case of a document with hundreds, or thousands, of words, and thus segments, the number of layers will clearly exceed the number illustrated in FIG. 1. However, using the same logic one can arrive at the top hash regardless of the number of initial segments, since each layer will, usually, have half the number of nodes of the immediately preceding layer.

In some embodiments, the Merkle tree may narrow faster than by a factor of two per layer. For example, a next layer in the tree may, for each node in this next layer, obtain an input to a hash function from four nodes comprised in the previous layer, to obtain a narrowing by a factor of four per layer. Thus a node in the next layer may store a hash obtained from four hashes from the previous layer. Narrowing faster than by a factor of two per layer provides the advantage that for long documents, the Merkle tree is faster to obtain and will require less memory to store.

The top hash may be stored in a block chain, for example by performing a store transaction into the transaction data of the block chain. A timestamp may be generated in connection with storing the top hash in the block chain. The timestamp may be comprised in the transaction data of the block chain, to protect its integrity.

Alternatively, or additionally, to a hash function, an encryption function may be employed in the Merkle tree. Examples of encryption functions include the advanced encryption standard, AES, and Blowfish algorithms. In general, hash functions and encryption functions are examples of cryptographic operations.

At a later point in time, once the document is thus segmented and stored in the Merkle tree, a third party may be given authorization to view a subset of the segments, for example segments 10-20. This party may be provided with the corresponding segment values and the random values corresponding to these segment values, thus enabling the party to verify the leaf hash values in the Merkle tree by re-deriving them from the segment values and the corresponding random values. The party may also be provided with the top part of the Merkle tree, to enable verification of a correct correspondence between the leaf hashes and the top hash.

The top hash may also be verified to be the same as the one stored in the block chain, to verify the document was created at the time indicated by the timestamp. This may prove useful in proving, when confidential information was created, for example to resolve disputes relating to ownership of intellectual property.

With state of the art block chains, time resolution on when the document was first hashed onto the block chain can be as low as a few seconds. Such systems may be deployed privately or publicly. If deployed publicly the system may involve using proof-of-work for time stamping. With performance similar to Bitcoin this would mean that documents can be attributed times with about 15 minutes of resolution.

It is in many cases desirable to run the network privately, for example so as to avoid disclosing to the surrounding world that collaboration between parties is on-going. In order to do this, a permissioned ledger may be employed, where the consensus is governed by majority voting using public-private key signatures. In order for the network to be recognised legally, each of the involved organizations may include their public key into a non-disclosure agreement, NDA, which is signed by representatives for each of the parties. After the legal work is carried out, the network is started and the participants can start adding document hashes to the chain. An NDA is an example of an access control document. An NDA may contain a link to the block chain.

Figure 2:
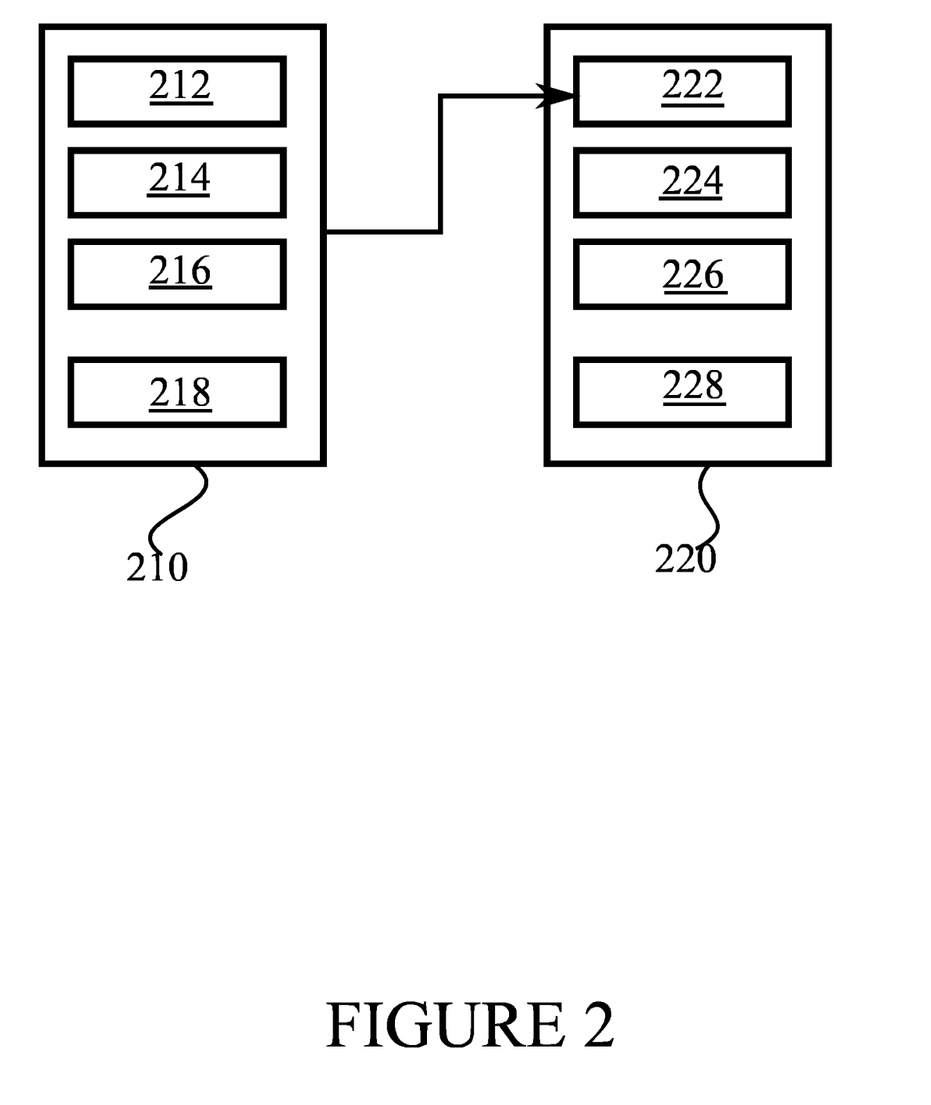
FIG. 2 illustrates an example of a block chain.

In addition, online meetings may be recorded by either or all of the parties. These meetings may be meetings within the party itself, or it may be in between companies. Each party may choose to add the hash of the recording to the block chain such that it later can be proved that the conversation indeed took place and specific details can be presented in a court of law, if needed. To this end, a similar Merkle tree may be constructed with video or audio frames, or parts thereof, together with random values, hashed and added to the Merkle tree. Adding the hash to the chain ensures that all organizations agree on time at which the meeting ended FIG. 2 illustrates an example of a block chain. While the figure has two blocks, in general a block chain may comprise more than two blocks as well, and in fact block chains frequently do comprise more than two blocks. Block 210 comprises a previous hash 212, a combined hash 214, a block hash 216 and a proof-of-work 218, which could also be another kind of proof, such as proof-of-stake. Similarly, block 220 comprises a previous hash 222, a combined hash 224, a block hash 226 and a proof-of-work 228, or any other suitable proof, such as proof-of-stake.

Block 210 comprises, in addition to the illustrated header fields also a set of transactions that forms the actual transaction data of the block. In terms of the present invention, the transactions may comprise top hash entries, optionally with their timestamps, provided for storage into the block chain. The transactions may also comprise different kinds of transactions, as the block chain need not be dedicated to one single type of transaction. An example of a possible further use is cryptocurrency. Previous hash 212 comprises a hash value calculated over a block that precedes block 210 in the sequence of the block chain, unless block 210 is the overall first block. Previous hash 212 may be calculated over all data in this preceding block, or over header fields of the preceding block, for example. Combined hash 214 may comprise a hash of the hash from the previous block 212 together with the hash of the current block 216. In some embodiments the block is a Merkle tree. In another embodiment it may be a single transaction, or a list of transactions. Field 214 may be implicitly included in the block by which it would be required to be computed every time a block should be verified. Block hash 216 may comprise a hash calculated over the set of transactions in block 210, or over a set of hashes of said transactions, for example. In other words, block hash 216 is representative of transactions comprised in the block. Proof-of-work 218 may comprise a nonce with which the contents of block 210 yield a hash value in the target area of the output space of the hash function.

Block 220 resembles block 210 in structure, differing in the transactions comprised therein, and in the hashes. A hash of block 210 is stored as previous hash 222 in block 220. Combined hash 224 comprises a hash of the previous hash 222 and the current block hash 226. Block hash 226 may comprise a hash calculated over the set of transactions in block 220, or over a set of hashes of said transactions. In other words, block hash 226 is representative of transactions comprised in the block. Proof-of-work 228 comprises a nonce with which the contents of block 220 yield a hash value in the target area of the output space of the hash function.

To establish the next block, the transactions are broadcast into the network. Broadcasting here refers to a dissemination method suitable for the context, which will cause the transactions to be communicated to the nodes of the network in general. Reaching each and every node with each and every transaction is not strictly necessary. A node establishing the next block may be known as a miner node. A miner node may compile a set of transactions, which it receives from the broadcasts, for the next block, and search for a proof-of-work nonce that covers all the transactions in the set of transactions for the next block. For example, the proof-of-work nonce may be a numerical value, with which the contents of the next block, that is, the set of transactions, hashes to a value that is less than a threshold. More generally, there may be a target area of an output space of a hash function, wherein the target space need not be in the low end of the target space. The smaller the target area is, the more difficult it is to discover the proof-of-work. Once a miner discovers the proof-of-work, it can publish the block, which other nodes of the system will then add to the block chain as the new most recent established block.

In case the miner node discovers a proof-or-work based on an incomplete set of transactions, for example if some transactions didn't reach the miner node, other nodes in the network will not accept the block into the block chain, and it will be excluded from a consensus version of the block chain in the system.

Since an output of a hash function is a pseudorandom function of the input, the set of transactions, hashed by itself, produces a hash value that is essentially randomly placed in the output space of the hash function. Note, that the set of transactions may be completely or representatively present as input to the hash function. Modifying the input with a candidate proof-of-work value, which may be known as a nonce, will produce a new hash value, which again is essentially randomly placed in the output space of the hash function. The modification may be as slight as a single bit. Therefore, searching for the correct proof-of-work nonce which satisfies a pre-agreed criterion concerning the location of the output in the output space of the hash function, requires repeatedly deriving a hash value with a different candidate proof-of-work nonce modifying the input to the hash function. Once a proof-of-work nonce that, with the transactions, produces a hash value in the target area of the output space of the hash function is found, the block is ready. A ready block may be distributed to the system to establish it therein in the block chain.

Once a new block is established, the block chain becomes longer. A transaction is considered the more reliable, the larger the number of blocks established since the block where the transaction is comprised. This is so, since transactions are hashed into the chain of blocks, and discrepancies in the block chain are resolved as the block chain gets longer. In each next block in the sequence, a hash of the previous block may be included along with the transactions, attaching the blocks to each other to form the chain. Hashes linking the blocks together to form a chain may be referred to as Merkle hashes. In detail, maliciously modifying a transaction in a block far down the chain would involve re-doing the work of finding proofs-of-work for all subsequent blocks, since the input to the hash function for the block comprising the transaction would be changed, causing the resulting hash value, with the proof-of-work in that block, to no longer be disposed in the desired area in the output space of the hash function.

Although discussed above in terms of proof-of-work, in some embodiments a proof-of-stake or other mechanism may be used instead of, or additionally to, a proof-of-work. In a proof-of-stake based system, a new block is accepted once a sufficient fraction of resources are proven as owned by nodes ready to accept the new block version.

While the block chain of FIG. 2 is an illustrative example, block chains may be somewhat simpler in their structure as well, as long as the idea of joining the blocks together in a meaningful way is achieved. For example, a block may comprise, in general, transactions of that block, a hash of a previous block and a proof-of-work nonce.

Figure 3:
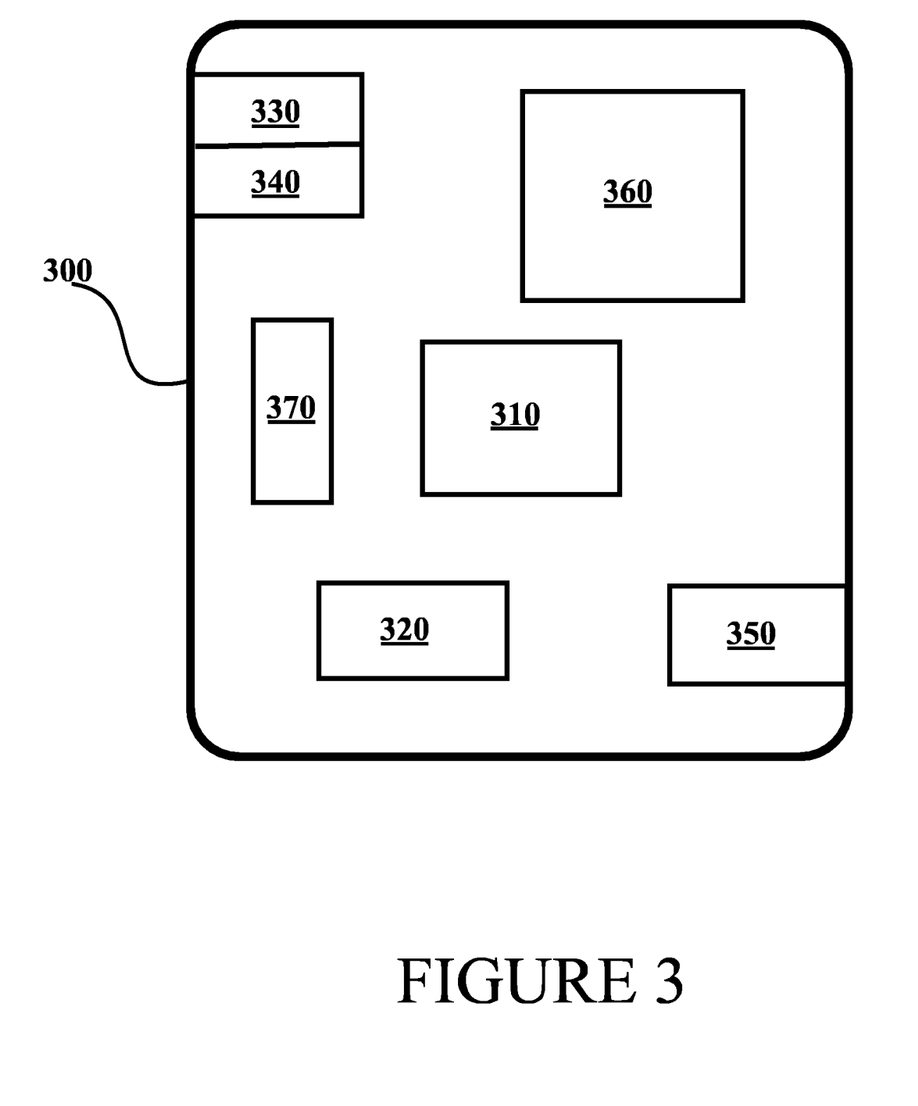
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a server or other computing device configured to build Merkle trees and/or maintain a block chain. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to cause documents to be stored in a Merkle tree.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
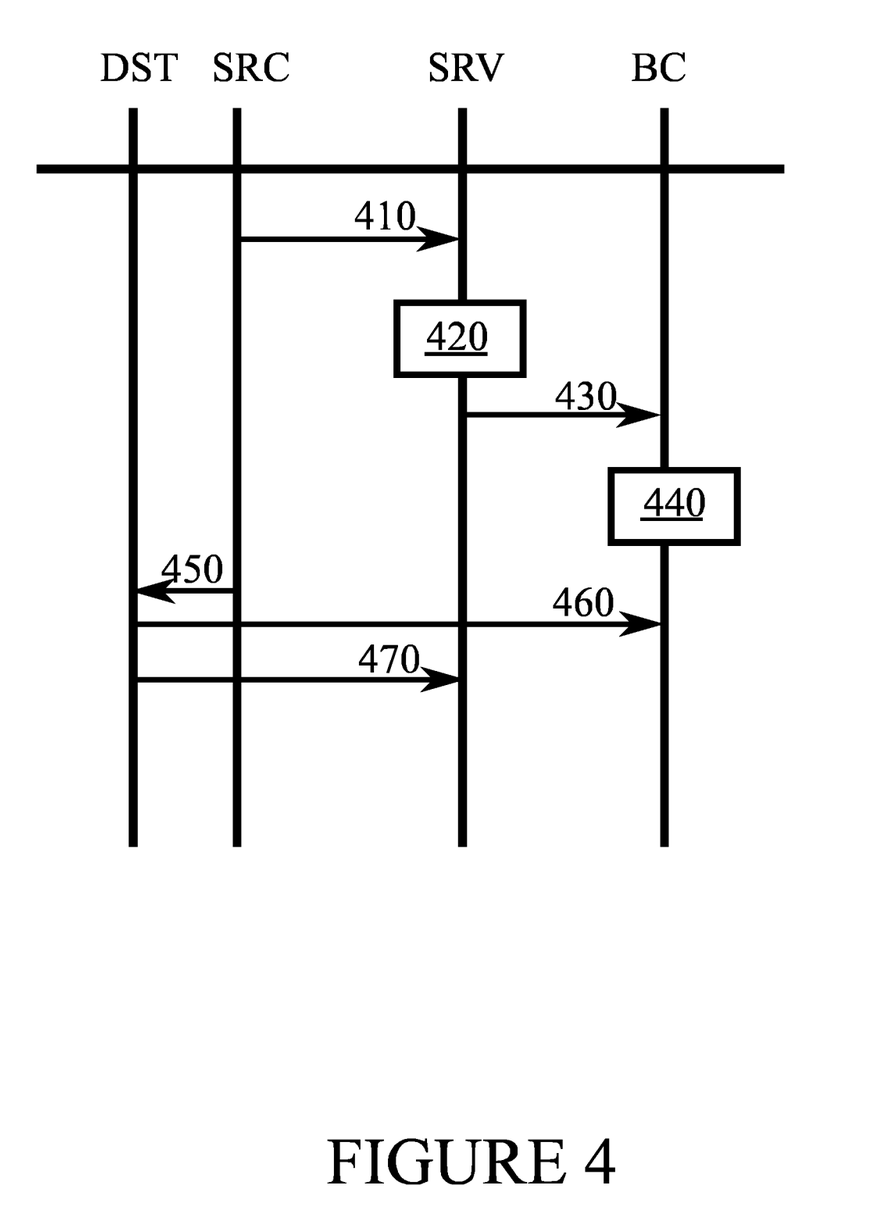
FIG. 4 illustrates signalling in accordance with at least some embodiments of the present invention.

FIG. 4 illustrates signalling in accordance with at least some embodiments of the present invention. On the vertical axes are disposed, from the left to the right, a destination user DST, a source user SRC, a server SRV, and a block chain BC. Time advances from the top toward the bottom.

In phase 420, source user SRC provides his document to server SRV. Responsively, server SRV segments the document and builds a Merkle tree of the document, as described herein above in connection with FIG. 1. In phase 430, server SRV performs a store transaction of the top hash of the Merkle tree into block chain BC. Block chain BC may be maintained in server SRV or in another computing substrate. Block chain BC establishes a next block in phase 440, this next block comprising the store transaction of phase 430.

In phase 450, source user SRC gives at least partial access to the document to destination user DST. Destination user DST accesses the block chain in phase 460, and the Merkle tree in server SRV in phase 470. Phases 460 and 470 may take place in either order.

Acting as described herein, the destination user DST advantageously is enabled to verify a part of the document existed at a given time, without gaining access to the entire document.

Figure 5:
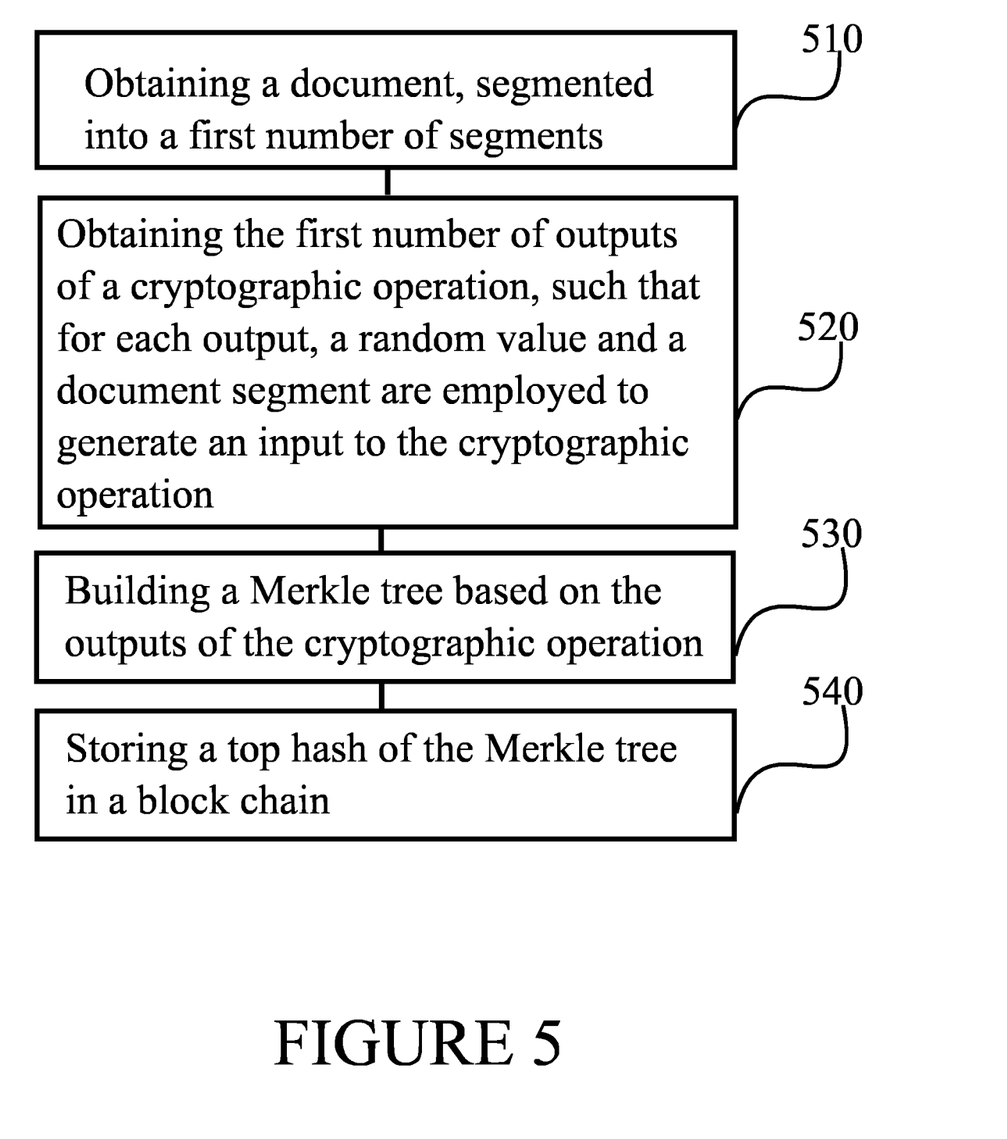
FIG. 5 is a flow graph of a method in accordance with at least some embodiments of the present invention.

FIG. 5 is a flow graph of a method in accordance with at least some embodiments of the present invention. The phases of the illustrated method may be performed in a computing device, or in a control device configured to control the functioning thereof, when installed therein.

Phase 510 comprises obtaining a document, segmented into a first number of segments. Phase 520 comprises obtaining the first number of outputs of a cryptographic operation, such that for each output, a random value and a document segment are employed to generate an input to the cryptographic operation. For example, exactly one random value and exactly one document segment may be employed to generate the input to the cryptographic operation. Phase 530 comprises building a Merkle tree based on the outputs of the cryptographic operation. Finally, phase 540 comprises storing a top hash of the Merkle tree in a block chain.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in securing documents and parts thereof from disclosure, and/or enabling verification of a time of creation of documents.

Acronyms List

AES Advanced encryption standard
NDA Non-disclosure agreement
SHA Secure hash algorithm (available as SHA-1, SHA-2 and SHA-3 versions)
XOR Exclusive-OR

REFERENCE SIGNS LIST

| | |
|---|---|
| 110-140 | Nodes of the Merkle tree of FIG. 1 |
| 210, 220 | Blocks in the block chain of FIG. 2 |
| 212, 214, 216, 218 | Fields in block 210 (FIG. 2) |
| 222, 224, 226, 226 | Fields in block 220 (FIG. 2) |
| 300-370 | Structure of the device of FIG. 3 |
| 410-470 | Phases of the method of FIG. 4 |
| 510-540 | Phases of the method of FIG. 5 |

The invention claimed is:

1. An apparatus comprising at least one processing core, at least one memory including computer program code, the at least one memory and the computer program code being configured to, with the at least one processing core, cause the apparatus at least to:
obtain a document, segmented into a first number of segments, the document comprising a text document comprising words, an audio clip or a video file;
obtain the first number of outputs of a cryptographic operation, such that for each output, a random value and a document segment are employed to generate an input to the cryptographic operation,
build a Merkle tree based on the outputs of the cryptographic operation,
store a top hash of the Merkle tree in a block chain, and cause a timestamp to be included in the block chain, the timestamp indicating a time when the top hash is stored in the block chain.

2. The apparatus according to claim 1, wherein the cryptographic operation comprises a hash operation.

3. The apparatus according to claim 1, wherein the cryptographic operation comprises an encryption operation.

4. The apparatus according to claim 1, wherein for the each output, the apparatus is configured to generate the input to the cryptographic operation by concatenating a first byte array corresponding to the random value and a second byte array corresponding to the document segment.

5. The apparatus according to claim 1, wherein for the each output, the apparatus is configured to generate the input to the cryptographic operation by performing an exclusive-or operation with the random value and the document segment.

6. The apparatus according to claim 1, wherein the apparatus is further configured to store a link to the block chain in an access control document.

7. The apparatus according to claim 1, wherein each document segment comprises one of the following: exactly one word, exactly two words, exactly three words, exactly four words, exactly five words, an image and a segment of recorded sound.

8. The apparatus according to claim 1, wherein the apparatus is further configured to add a new block to the block chain.

9. A method comprising:
obtaining a document, segmented into a first number of segments, the document comprising a text document comprising words, an audio clip or a video file;
obtaining the first number of outputs of a cryptographic operation, such that for each output, a random value and a document segment are employed to generate an input to the cryptographic operation,
building a Merkle tree based on the outputs of the cryptographic operation,
storing a top hash of the Merkle tree in a block chain, and causing a timestamp to be included in the block chain, the timestamp indicating a time when the top hash is stored in the block chain.

10. The method according to claim 9, wherein the cryptographic operation comprises a hash operation.

11. The method according to claim 9, wherein the cryptographic operation comprises an encryption operation.

12. The method according to claim 9, wherein for the each output, the method comprises generating the input to the cryptographic operation by concatenating a first byte array corresponding to the random value and a second byte array corresponding to the document segment.

13. The method according to claim 9, wherein for the each output, the method comprises generating the input to the cryptographic operation by performing an exclusive-or operation with the random value and the document segment.

14. The method according to claim 9, wherein the method further comprises storing a link to the block chain in an access control document.

15. The method according to claim 9, wherein each document segment comprises one of the following: exactly one word, exactly two words, exactly three words, exactly four words, exactly five words, an image and a segment of recorded sound.

16. The method according to claim 9, wherein the method further comprises adding a new block to the block chain.

17. A non-transitory computer readable medium having stored thereon a set of computer readable instructions that, when executed by at least one processor, cause an apparatus to at least:
obtaining a document, segmented into a first number of segments, the document comprising a text document comprising words, an audio clip or a video file;
obtaining the first number of outputs of a cryptographic operation, such that for each output, a random value and a document segment are employed to generate an input to the cryptographic operation,
building a Merkle tree based on the outputs of the cryptographic operation,
storing a top hash of the Merkle tree in a block chain, and causing a timestamp to be included in the block chain, the timestamp indicating a time when the top hash is stored in the block chain.

* * * * *